(12) United States Patent
Ullman (10) Patent No.: US 6,360,491 B1
(45) Date of Patent: Mar. 26, 2002

(54) ROOF SUPPORT SYSTEM FOR A SOLAR PANEL

(76) Inventor: Stanley A. Ullman, Camarillo, CA (US)

(*) Notice: Subject to any disclaimer, the term of this patent is extended or adjusted under 35 U.S.C. 154(b) by 0 days.

(21) Appl. No.: 09/758,407

(22) Filed: Jan. 10, 2001

Related U.S. Application Data

(60) Provisional application No. 60/176,126, filed on Jan. 14, 2000.

(51) Int. Cl.[7] .................................................. E04B 7/00
(52) U.S. Cl. ........................... 52/22; 52/173.3; 52/263; 52/58; 52/90.2; 52/198; 52/299; 52/704; 248/237; 248/519; 248/530; 248/156; 256/65
(58) Field of Search ................................ 52/173.3, 263, 52/58, 90.2, 198, 299, 704; 248/237, 519, 530, 156; 256/65

(56) References Cited

U.S. PATENT DOCUMENTS 5,603,187 A * 2/1997 Merrin et al.

* cited by examiner

Primary Examiner—Carl D. Friedman
Assistant Examiner—Chi Q. Nguyen
(74) Attorney, Agent, or Firm—Ralph D. Chabot

(57) ABSTRACT

A new mounting system for elevating and supporting objects such as solar panels and satellite dishes upon a roof. The mounting base for attachment to a roof rafter incorporates a threadable elongated member or stanchion and only requires a single lag bolt which is positioned directly beneath the stanchion for fastening to a roof rafter. A guide tunnel is also provided on the roof mount for proper drill angle into the rafter.

The solar panel support utilizes C-shaped extruded aluminum horizontal members where, upon fastening the solar panel to the members, enhances the strength properties from a C-shape to a square structural member.

The disclosed design for the solar panel support and associated equipment which are attached to at least two mounting bases, permits efficient packaging, resulting in minimal packaging time and cost.

21 Claims, 7 Drawing Sheets

ROOF SUPPORT SYSTEM FOR A SOLAR PANEL

CLAIM OF PRIORITY

This application claims the benefit of U.S. Provisional Application bearing serial No. 60/176,126 filed Jan. 14, 2000.

BACKGROUND OF INVENTION

The present invention relates to the building industry and specifically to mounting equipment and the method for securing this equipment to rafters. The mounting equipment, once secured to the rafters, can be used to support objects such as solar panels.

The roofs of building structures have been used for placement of many objects such as air conditioning units, solar panels, satellite dishes, etc. The primary reason for location of these objects upon a roof is the lack of alternative space.

Air conditioning units, because of their relative heavy weight, provide a downward force upon the roof in any weather condition. However, a problem exists for other objects such as satellite dishes and solar panels, which can, in certain windy conditions, be lifted off the roof mounting because the force of the wind applied against the surface area on the side or underside of the object creates an uplift condition which is greater than the attachment strength of the roof mount to the roof deck.

Besides the need for compliance with governmental building code requirements, a more efficient method for installing a mounting system to a roof is highly desired by roof installers. A faster installation would reduce the labor costs associated with each install.

One of the problems with present installations is the fact that more than one lag bolt or other type of fastening bolt is required for each mounting plate which is secured to the roof. The risk is high that some of the lag bolts will drill at an angle other than perpendicular to the roof rafter. The severity of the angle and the trajectory of the lag bolt penetration into the rafter could cause the rafter to split; further reducing the structural integrity of the mounting system.

For many years, existing solar mounting systems were installed using a threaded pipe nipple that screwed into a mounting plate commonly called a "floor flange" in the trade. The threaded floor flange has been commercially available as a standard plumbing item for many years. U.S. Pat. No. 5,603,187 issued to Merrin et al. is typical of the prior art. The Merrin design, as well as all similar prior art, have a common design limitation. They all require that multiple bolts be installed offset from the threaded vertical support flange or stanchion. Also, because of the floor flange design, it would not permit industry standard flashing to install flat on the roof; primarily due to the base flashing circumference interfering with the height of the floor flange.

A mounting system based upon the Merrin patent, while appropriate for roof mounting of heavy objects such as air conditioners, is not practical for use with solar panels or satellite dishes. The Merrin design precludes direct (bolted) attachment to the roof rafter by each of the mounting holes present on the base plate; primarily due to the width of the rafter in relation to the spacing of the mounting holes. Further, Merrin views rafter attachment as a limitation and therefore teaches away from using rafters for structural support. Therefore, Merrin teaches attachment to the roof decking which generally consists of only plywood or a composite sheeting; either of which do not provide the strength of a bolt mounted to a rafter in an uplift condition.

SUMMARY OF INVENTION

This invention presents a new mounting system for elevating and supporting objects such as solar panels and satellite dishes upon a roof. The roof mount would be attached prior to installation of the roof flashing. The component parts for supporting a solar panel or satellite dish would be assembled and attached to the roof mount over the flashing. Features of the invention are as follows:

1. a new roof mount having a threadable elongated member or stanchion which requires a single lag bolt positioned directly beneath the stanchion for fastening to a roof rafter. A guide tunnel is also provided on the roof mount for proper drill angle into the rafter.
2. A support design comprising either a composite or aluminum extruded C-shaped horizontal members and associated equipment for attachment to a plurality of roof mounts which will support a mounted object such as a solar panel. The design, when utilized and having upon it mounted a solar panel or other structure, enhances the strength properties from that of a C-shaped horizontal member to those of a square structural member.
3. The support design permits efficient packaging, resulting in minimal packaging time and cost.

Roof Mount

In order to utilize my mounting system, a roof mount must first be secured to a rafter. The roof mount is preferably machined from aluminum and comprises a threaded cavity with an insertion opening for threadably receiving a vertical stanchion. Directly below the cavity is an aperture for insertion of a lag bolt for attachment to the rafter. This is a unique feature of my support base. Only one lag bolt or other type of fastening bolt is required. For a one bolt design, having the attachment force positioned directly beneath the stanchion provides the highest level of attachment strength.

Additionally, a special hollow can be machined at the base of the channel to allow clearance for the bolt head when installed so that it does not contact the bottom surface area of the stanchion. This permits maximum threadable engagement of the stanchion to the base.

The base section of the roof mount comprises a base for direct contact with the decking surface of a roof and a vertically extending cylindrical member having the threaded cavity and an offset wall having a guide tunnel. It is not necessary that the guide tunnel be part of the cylindrical member. It is however, preferable to maintain a minimum distance between channel and guide tunnel so that it is easy to use the guide tunnel to drill a pilot hole into a rafter and to thereafter align the pilot hole with the aperture by sliding the base section a minimal distance.

The distance between the cavity and guide tunnel however, must be sufficient so as not to compromise the overall structural integrity of the base section.

In an alternative design, the guide tunnel is not used and the roof mount base section simply incorporates my single bolt design described above which includes a base and a vertically extending cylindrical member having the threaded cavity.

The base can be of any geometrical shape such as circular, rectangle or square. All that is required is that the geometrical shape be sized accordingly so that it does not interfere with the alignment or use of commercially available flashing to the roof.

Once the lag bolt is secured to the rafter, one end of the stanchion is inserted and secured within the threaded cavity and the roof flashing is thereafter installed. For purposes of this specification, the base section and the stanchion/elongated member are collectively referred to as the roof mount. Although the mounting equipment may be installed days later, it is preferable to install the roof mount at this point.

Solar Panel Support and Installation

A pair of C-shaped horizontal members are provided for attachment to roof mounts and support an object, such as a solar panel, above the roof. Each horizontal member is preferably made from extruded aluminum and can be manufactured to any length. Each horizontal member has a track which can be used by slidable inserts which have been designed to fit within and slide along this track. These slidable inserts have a female threaded hole for receiving a fastening bolt; the use of which will be described later.

A clamp having a hole is provided for each slidable insert. The clamp hole is positioned so that a fastening bolt can be inserted through and secured to the threaded hole of the threadable insert. There are two types of clamps available: end clamps and bi-module clamps.

Bi-module clamps are primarily used for securement of the sides of two solar panel modules. A module is a set of photovoltaic cells while a solar panel is a plurality of modules. End clamps would secure the sides of a solar panel. In any case, bi-module clamps are used to secure the sides of two adjoining solar modules to the horizontal member.

Each horizontal member has a pair of end clamps for securement of a solar panel. Each end clamp has a slight rise or heel on its bottom surface distally positioned from its clamping surface. This slight rise provides a pair of advantages when attaching solar modules. First, the slight rise prevents twisting of the clamp while it is being bolted into position on the horizontal member. Second, when the end clamp is engaged to a solar module frame, the rise forces the clamp inward at 90 degrees to fully engage a module frame. This design prevents the end clamp from inadvertently separating the module frame from its glass. Also, the rise provides spring tension against the module frame, providing full engagement as the module laminate glass and frame flex under extreme stresses caused by weather conditions such as high wind and snow.

The solar panel support includes the horizontal members, slidable inserts, end clamps, bi-module clamps and the attachment means to a roof mount. The roof mount can be the one described as part of this invention or it can be one already available in the prior art. The attachment means would comprise holes drilled in the horizontal members which are aligned with and mounted to the already installed roof mounts. A mounting bolt or the like would be used to attach the horizontal members to the roof mount.

Alternatively, it is possible to use composite material instead of aluminum for the solar panel support and roof mount.

Packaging

The horizontal members and associated mounting equipment described in the preceding section have been designed so that they can be packaged quickly; resulting in minimal labor cost associated with packaging as well as reduced packing material cost. The design prevents damage to the mounting equipment by effectively enclosing the clamps and inserts between the C-shaped horizontal members. With the open side of the C-shaped horizontal members facing each other, an elongated tubular square member is formed and all that is necessary from a packaging standpoint, is sealing the ends of the tubular member. Horizontal ridges are formed into the end surface of the open sides. The engagement of these ridges from facing C-shaped horizontal members mate or interlock. This maintains the elongated tubular configuration and facilitates product packaging.

DETAILED DESCRIPTION

FIG. 1 through FIG. 6 illustrate the sequence for installing my roof mount to a rafter.

Figures 1, 2, 3:
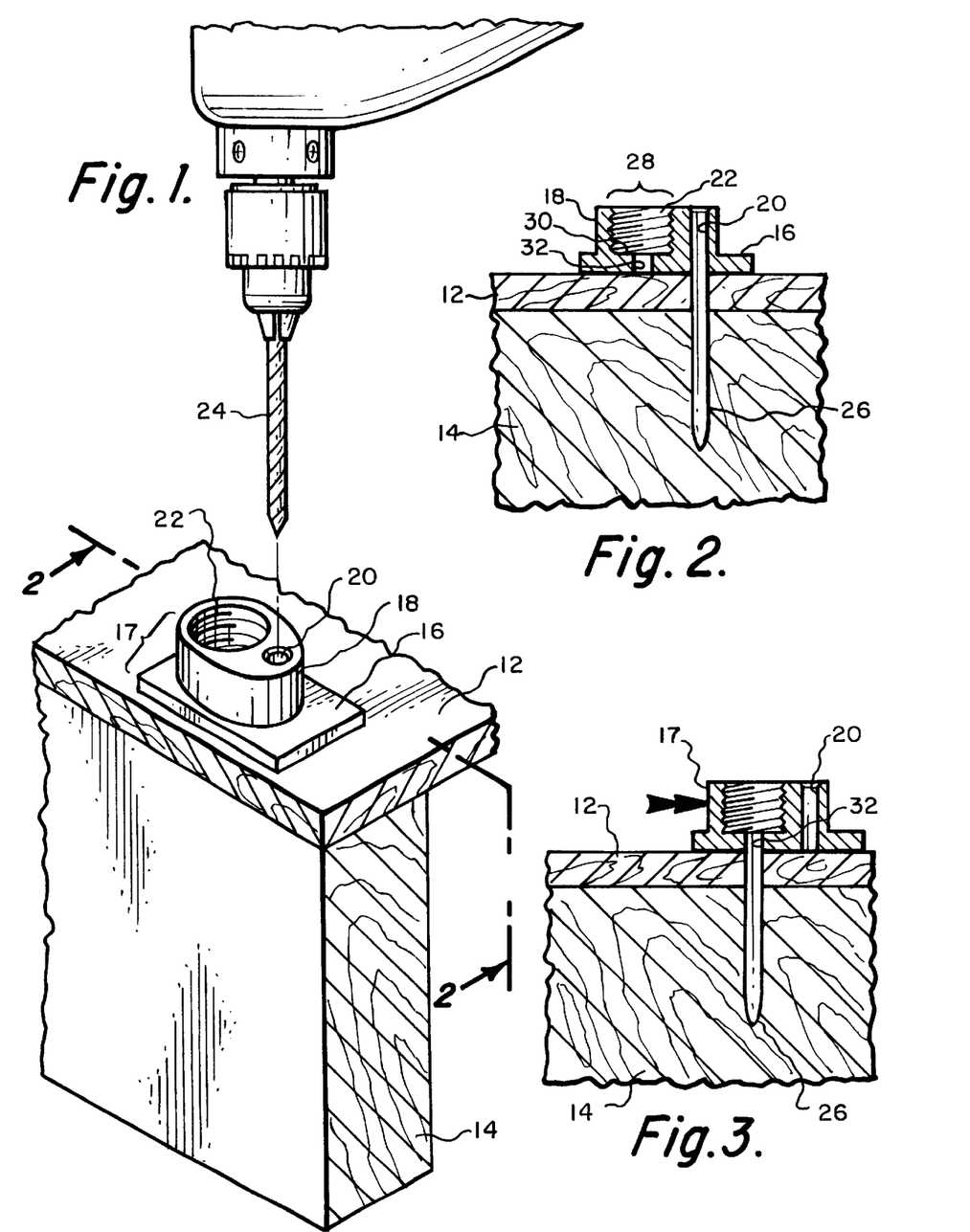
FIG. 1 is a perspective view and illustrates the position of the base section of the roof mount above a rafter and a drill positioned for drilling a pilot hole.
FIG. 2 is a view taken along line 2—2 of FIG. 1 and which shows a drilled pilot hole.
FIG. 3 indicates the roof mount displaced so that the pilot hole is in alignment with the support channel.

FIG. 1 illustrates the general relationship of base section 17 to a roof having decking 12 and rafter 14.

Base section 17 comprises a base 16 and a cylindrical member 18 integral with and extending away from base 16. Cylindrical member 18 has an offset wall area.

As illustrated in FIG. 2, base section 17 has a guide tunnel 20 which extends from the top of cylindrical member 18 to the bottom of base 16. The purpose of guide tunnel 20 is to provide perpendicular alignment of drill bit 24 to rafter 14 for the drilling of pilot hole 26. Perpendicular alignment is important because it minimizes the probability of rafter splits, as can occur when a pilot hole is drilled which is not in perpendicular alignment to the rafter.

Cylindrical member 18 further has a cavity 22, the top of cavity 22 defining an insertion opening 28. The walls of cavity 22 are threaded for engaging a stanchion 42 as will be discussed later.

Defining the bottom of cavity 22 is top surface 30. A hole 32 extends from top surface 30 through base 16. Hole 32 has a common axis of symmetry with cavity 22 and is designed to accept the stem 36 of a fastening bolt 34 as shown in FIG. 4.

With the alignment as shown in FIG. 1, drill bit 24 is inserted into guide tunnel 20 and a pilot hole 26 is drilled into rafter 14 as shown in FIG. 2.

Base section 17 is then displaced along decking 12 until pilot hole 26 is aligned with hole 32 as shown in FIG. 3.

Figure 4:
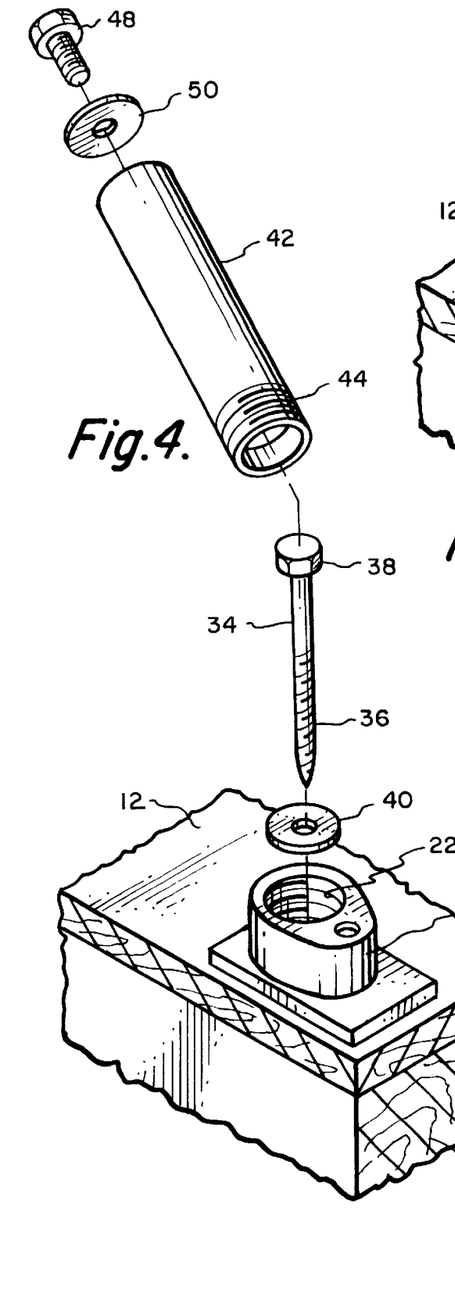
FIG. 4 is an exploded view showing the lag bolt and stanchion relationship to the roof mount.

FIG. 4 illustrates the relationship of fastening bolt 34 and stanchion 42 to base section 17. Once hole 32 is aligned with pilot hole 26, fastening bolt 34 is inserted through washer 40 and screwed into rafter 14. Fastening bolt head 38 remains within cavity 22. Stanchion 42 has a male threaded end 44 and is inserted through insertion opening 28 for threadable engagement within cavity 22.

Figure 5:
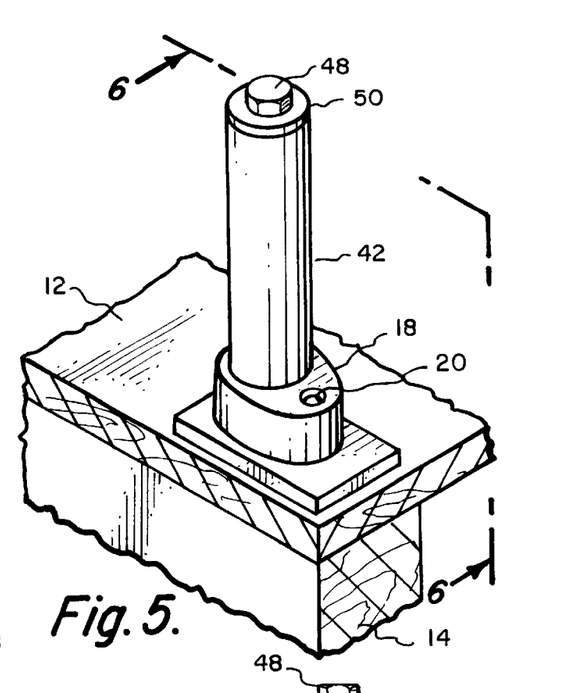
FIG. 5 is a perspective view when the lag bolt and stanchion are assembled to the roof mount.
Figure 6:
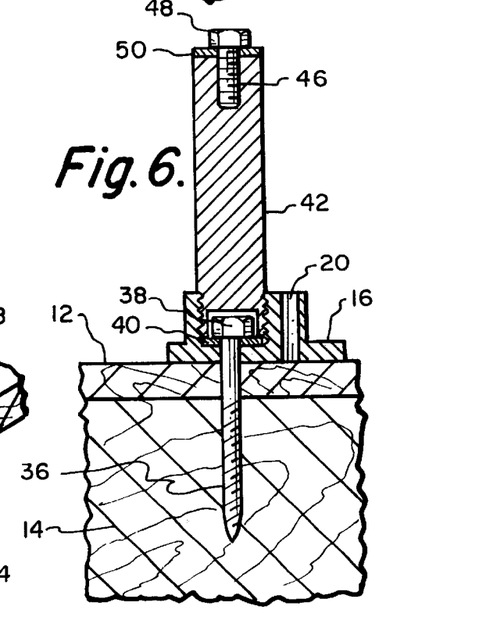
FIG. 6 is a view taken along line 6—6 of FIG. 5.

Distal from threaded end 44 is female threaded end 46 for frictional engagement of mounting bolt 48 and washer 50. FIG. 5 and FIG. 6 illustrate the assembled roof mount 10 fastened to rafter 14. Roof mount 10 comprises base section 17, stanchion 42 along with threadably connected mounting bolt 40 and washer 50.

In practice, the rafters 14 and decking 12 will be installed prior to the installation of roof mount 10. A single pilot hole 26 is drilled for each roof mount which, due to my design, will be perpendicular to the roof rafter and minimize the risk of rafter split. The number of roof mounts used will be determined by the size of the object to be mounted.

Once the pilot hole is drilled, base section 17 is slid a short distance and fastening bolt 34 is inserted to fasten base section to rafter 14. Again, because only one hole is drilled into the rafter for each roof mount 10, less labor time is required than with typical floor flanges.

Figures 7, 8:
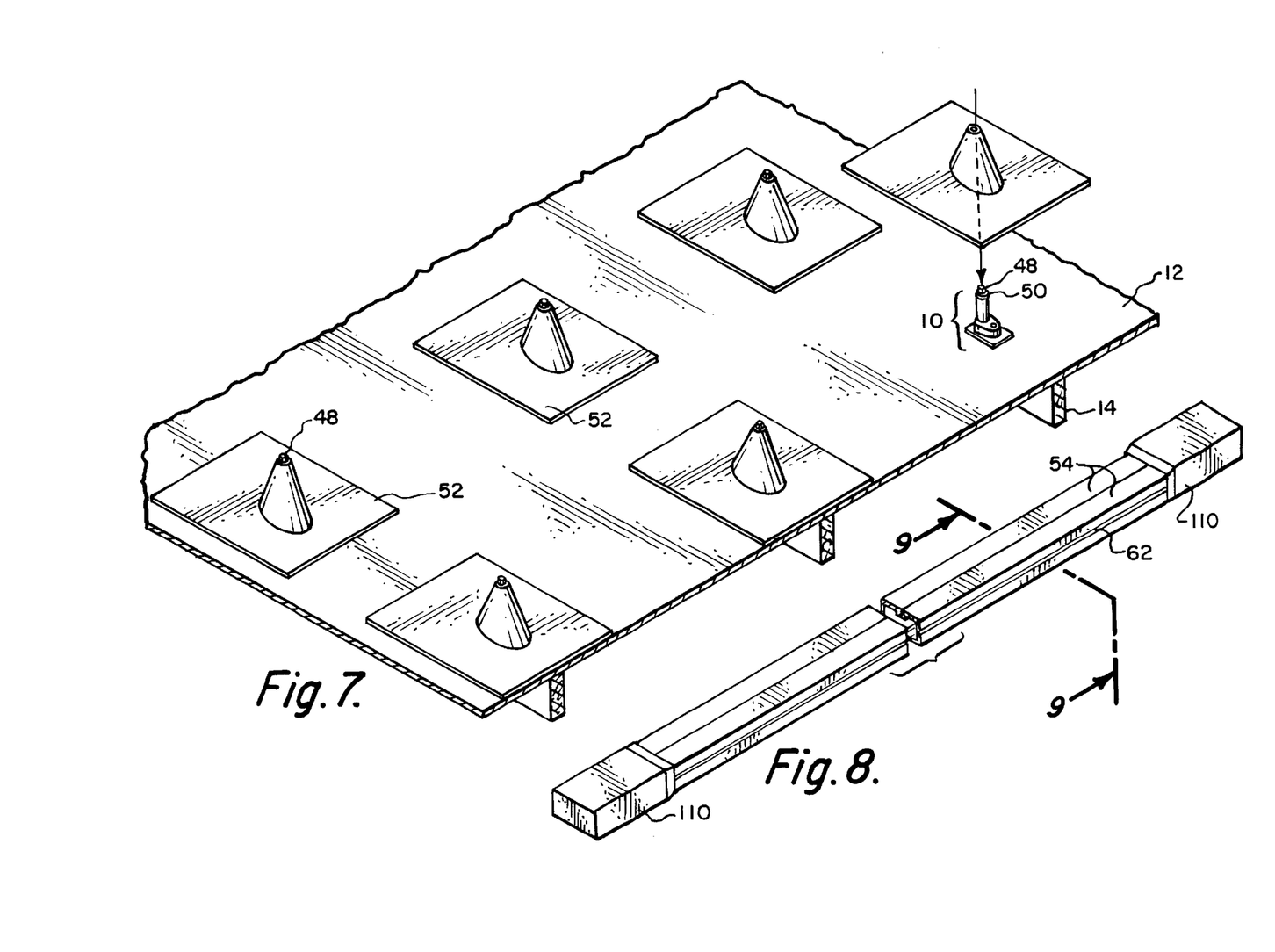
FIG. 7 is a perspective view illustrating the relationship of the assembled roof mount to flashing material.
FIG. 8 is a perspective view of the package comprising a pair of elongated C-shaped members and associated equipment.

Once all roof mounts 10 have been fastened to their respective rafters, flashing 52 must be installed to protect the roof from the risk of future water damage. FIG. 7 illustrates the arrangement of multiple flashings 52 over a plurality of roof mounts 10. Following flashing installation, the decking 12 is typically layered with roofing material (not shown).

Although my mounting system can be utilized for a variety of objects to be mounted above a roof, the following procedure will address installation of a solar panel having multiple modules.

Once the roof is in a condition for installing a solar panel, a pair of C-shaped elongated horizontal members 54 are provided. Each horizontal member 54 has a base wall 56 and a pair of side walls 58 and 60. A linear groove 62 runs along the bottom surface of base wall 56 as can be seen in FIG. 9a and FIG. 10.

Figures 9, 9A, 10:
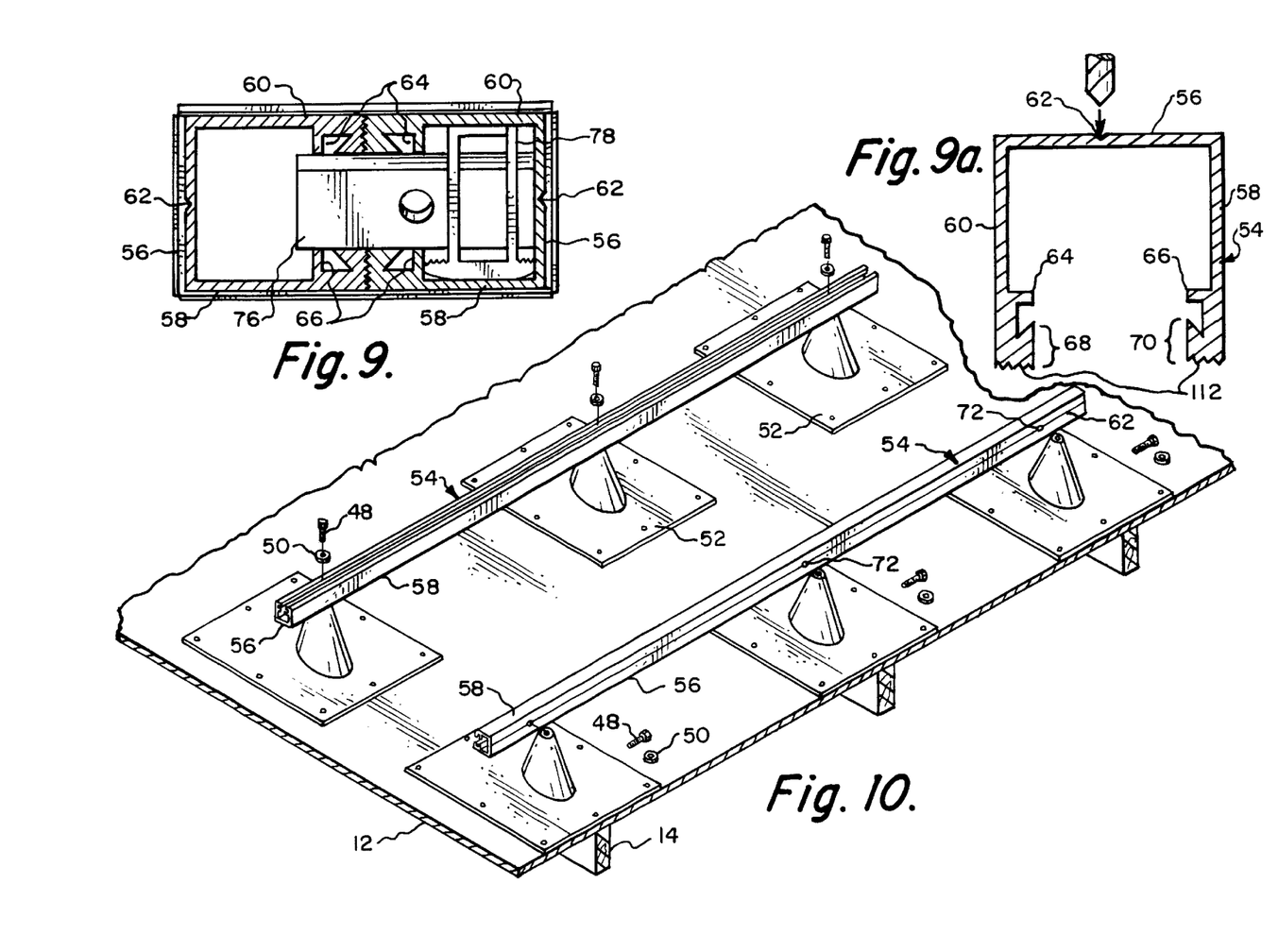
FIG. 9 is a view taken along line 9—9 of FIG. 8.
FIG. 9a is a end view of an elongated U-shape member depicting a linear positioning groove for a drill bit to make a hole.
FIG. 10 is a perspective view illustrating the attachment of an elongated C-shaped member to a plurality of stanchions.

FIG. 9a also illustrates a pair of horizontal ledges 64 and 66 extending inward from sidewalls 58 and 60 toward each other. These ledges extend the length of sidewalls 58 and 60. A pair of protruding lips 68 and 70 extend inward from the distal end of sidewalls 58 and 60 relative to base wall 56. A track area is defined by the surface area of ledges 64 and 66 which face lips 68 and 70 respectively. The purpose of the track will be discussed below.

FIG. 10 illustrates the attachment of horizontal members 54 to roof mounts 10. Initially, mounting bolts 48 and washers 50 are removed from stanchions 42. Horizontal member 54 is positioned along each flashing cone. As shown in FIG. 9a, a drill is used to drill mounting holes 72 along groove 62 on base wall 56 for each roof mount. Once the first mounting hole 72 is drilled, additional mounting holes can be drilled by simply measuring the distance from the last hole drilled when the spacing between the rafters is known.

Figures 11, 12:
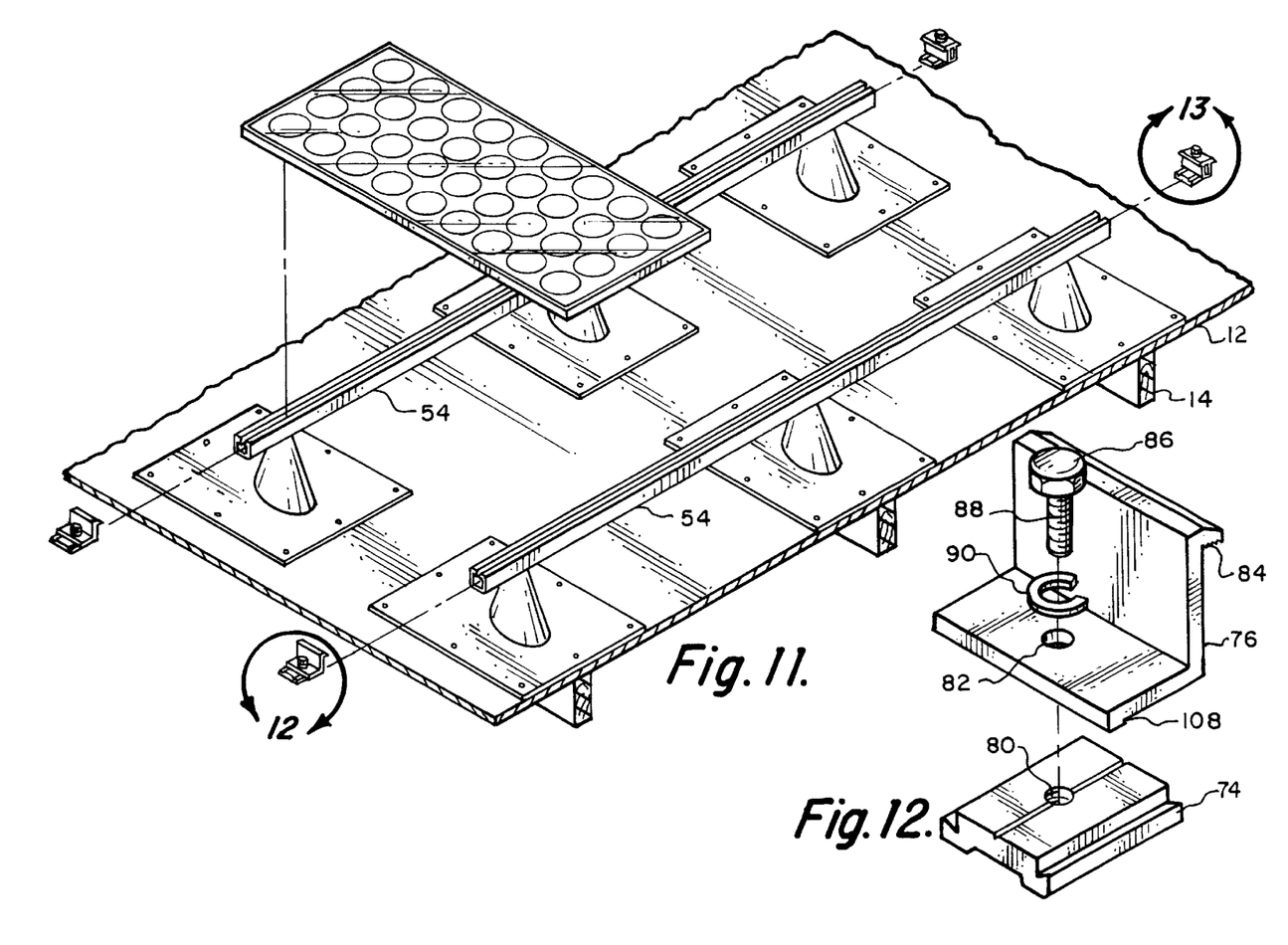
FIG. 11 is a perspective view illustrating the slidable relationship of clamps relative to the C-shaped member and the positioning of a solar module.
FIG. 12 is an exploded view of the relationship of an end clamp to a slidable insert.

Once all mounting holes 72 have been drilled, horizontal member 54, is positioned the above flashing cones with mounting holes 72 aligned with female threaded end 46. Mounting bolts 48 and washers 50 are then used to frictionally engage horizontal members 54 to respective roof mounts 10. FIG. 11 shows horizontal members 54 assembled to roof mounts 10.

Figures 13, 14:
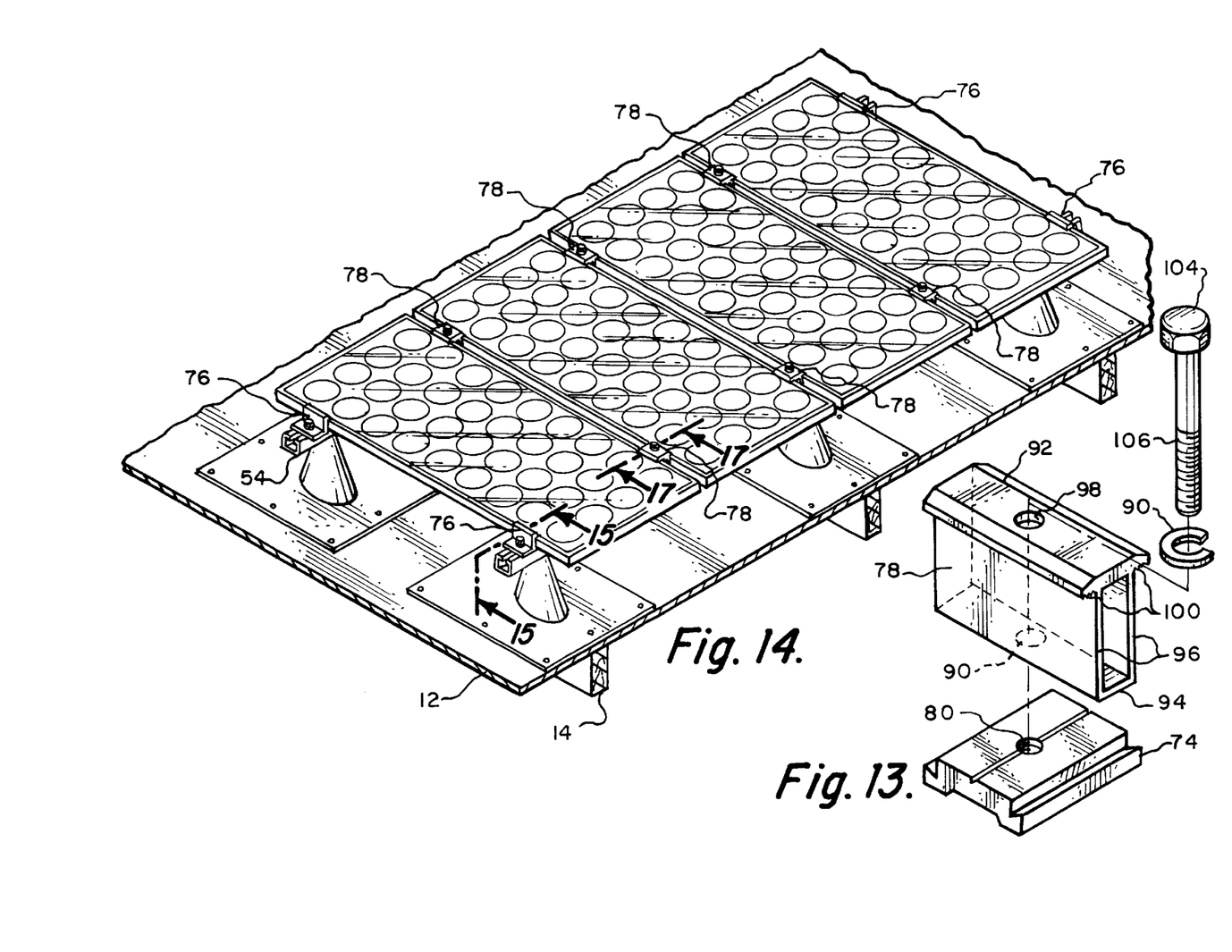
FIG. 13 is an exploded view of the relationship of a bi-module clamp to a slidable insert.
FIG. 14 is a perspective view of an assembled solar panel having 4 modules.

At least two slidable inserts 74 are provided for each horizontal member 54 and a general configuration is illustrated in FIG. 12 and FIG. 13. Insert 74 has a female threaded hole 80. The outer configuration of insert 74 is designed to be slidably received within track area of horizontal member 54. The required number of inserts 74 is dependent upon the number of clamps needed to secure the solar panel. There are two types of clamps available: end clamps 76 and bi-module clamps 78.

Figure 15:
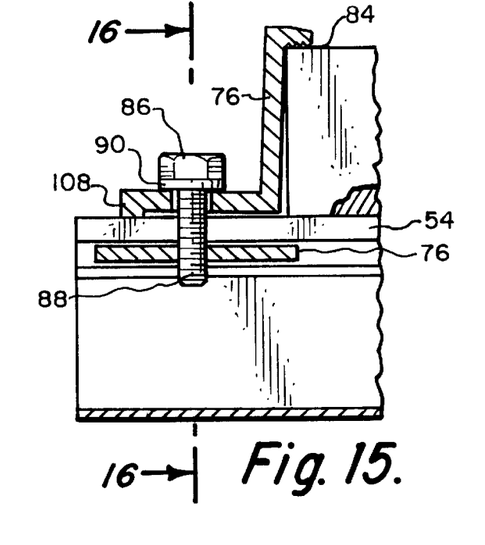
FIG. 15 is a side view showing a secured end clamp in relationship to the side of a solar panel.
Figure 16:
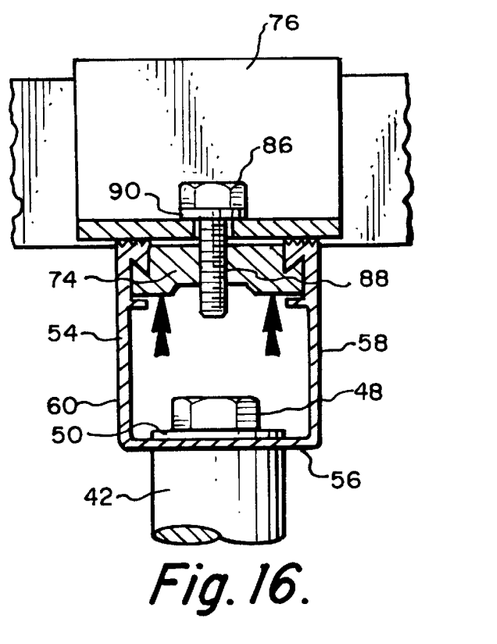
FIG. 16 is a view taken along line 16—16 of FIG. 15.

End clamp 76 is illustrated in FIG. 12 and has a hole 82 for alignment with threaded hole 80 on insert 74. End clamp 76 has a notched surface 84 for frictionally engaging the solar panel and securing it between notched surface 84 and horizontal member 54 when end clamp bolt 86 has its threaded stem 88 passed through washer 90 and hole 82 for engagement with threaded hole 80 on insert 74. FIG. 15 and FIG. 16 show the solar panel in frictional engagement between notched surface 84 and horizontal member 54.

Two end clamps 76 are used to secure a solar panel therebetween and along each horizontal member 54 when each end clamp 76 is threadably fastened to insert 74 using bolt 86. A solar panel is defined as at least one solar module and can be a number of modules in series as illustrated in FIG. 14. Therefore, four end clamps 76 are used to secure a solar panel to two horizontal members 54.

A bi-module clamp 78 is illustrated FIG. 13. They are used to secure the sides of two adjoining solar panel modules and to a horizontal member 54 when bi-module clamp 78 is threadably fastened to insert 74 using a bolt 104. The use of bi-module clamps 78 and end clamps 76 in my mounting system is best illustrated in FIG. 14.

The number of bi-module clamps required for each horizontal member 54 is determined by the formula:

number of bi-module clamps=(number of modules −1).

Figure 17:
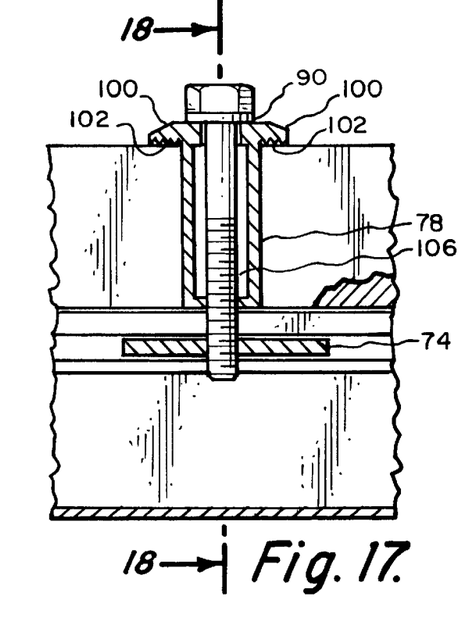
FIG. 17 is a side view showing a secured bi-module clamp in relationship to the adjacent sides of two solar modules.
Figure 18:
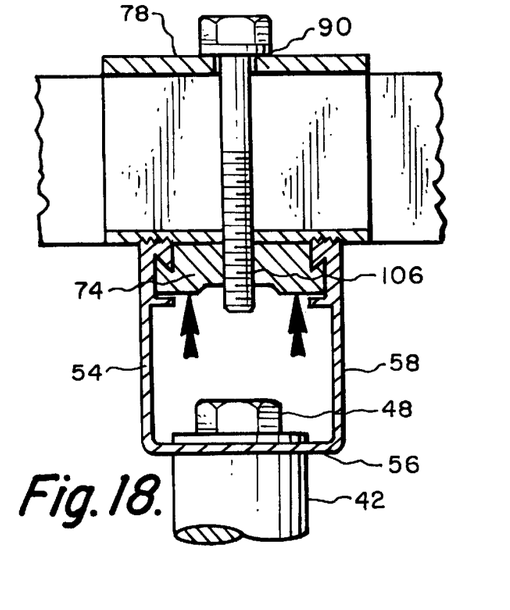
FIG. 18 is a view taken along line 18—18 of FIG. 17.

Each bi-module clamp 78 has a top side 92, a bottom side 94, a pair of side walls 96. Holes 98 located on top side 92 and bottom side 94 have a common axis of symmetry and are for alignment with threaded hole 80 on insert 74. Top side 92 extends perpendicularly away from side walls 96 in either direction forming overhangs 100 having notched surfaces 102. Notched surfaces 102 are for frictionally engaging the solar module and securing it between notched surface 102 and horizontal member 54 when bolt 104 has its threaded stem 106 passed through washer 90 and holes 98 for engagement with threaded hole 80 on insert 74. FIG. 17 and FIG. 18 show a pair of solar modules in frictional engagement between notched surfaces 102 and horizontal member 54.

As a slidable insert 74 is threadably engaged and frictionally positions either bi-module clamp 78 or end clamp 76 along member 54, insert 74 also frictionally engages an area of member 54. This relationship is illustrated in FIG. 16 and FIG. 18. This engagement changes the structural properties of member 54 to that of a structural square for enhanced strength. In addition, when engaged to the module or solar panel frame, the structural properties of the module frame combine with horizontal member 54 and form a rigid inter-locking trussed cross-section.

Each end clamp 76 has a slight rise 108 on its bottom surface distally positioned from its clamping surface and is illustrated in FIG. 12 and FIG. 15. Rise 108 prevents end clamp 76 from twisting while fastening bolt 86 to insert 74.

As best illustrated in FIG. 14, horizontal members 54 along with the associated component parts, namely slidable inserts 74, end clamps 76 and bi-module clamps 78 and the attachment means to roof mount 10 comprise a solar panel support structure.

FIG. 8 illustrates the unitized packaging for the mounting components, namely a pair of horizontal members 54 and the associated number of inserts 74, bi-module clamps 78, and a pair of end clamps 76. The ends of the horizontal members 54 are secured by tape or other packaging material 110. Packaging material 110 not only maintains the relationship of horizontal members 54 to one another, it also prevents the inserts and clamps from escaping.

As can be best seen in FIG. 9*a*, the outward facing surface 112 of the open side of horizontal member 54 has ridges. These ridges extend the length of each member 54 and form mating or interlocking surfaces when the open sides of two horizontal members 54 are aligned and contacted with one another. FIG. 9 illustrates two horizontal members 54 mated to one another and show a bi-module clamp 78 and an end clamp 76 in view.

During assembly, the inserts and clamps are placed into a horizontal member 54. Packing such as paper (not shown) is also inserted to prevent the inserts and clamps from excessive movement and potential wear and damage. The second horizontal member 54 is thereafter mated to the other member by cooperatively engaging along surfaces 112. Outside packaging is thereafter used to seal the open ends.

I claim:

1. A mounting system for mounting a solar panel containing at least one module above a roof having flashing and secured to at least one roof rafter, said mounting system comprising:
   a) at least two base sections for fastening to respective roof rafters, each base section comprising:
      a base and an integrated hollow cylinder, said cylinder having an offset wall and an insertion opening pointing away from the roof; an alignment means for ensuring that a pilot hole drilled into a rafter will be drilled at a perpendicular angle to the rafter; and a means for fastening the roof mount to a rafter;
   b) at least two stanchions having a top end and a bottom end, said bottom end being fitted into a respective insertion opening of a roof mount, thereby orientating said elongate member away from the roof, said elongate members being of sufficient length to extend at least to the top of the flashing material;
   c) support means for a solar panel; said support means positioned upon at least a pair of said stanchions; and
   d) means to secure said support means to at least a pair of said stanchions.

2. The mounting system of claim 1 wherein said alignment means is a guide tunnel formed in said offset wall and said base whereby said guide tunnel can receive a drill bit for drilling a pilot hole into a rafter.

3. The mounting system of claim 1 wherein said means for fastening comprises a hole extending from the hollow cylinder through said base so that a single lag bolt may be received through said insertion opening and fasten a base section to a roof rafter.

4. The mounting system of claim 1 wherein said support means comprises a pair of horizontal support members and a plurality of clamps slidably connected to said horizontal support members, where a solar panel once positioned upon said pair of horizontal support members is thereafter secured by the use of said clamps.

5. The mounting system of claim 1 wherein said means to secure said support means comprises threadably engaging the support means to the top end of a pair of said stanchions.

6. The mounting system of claim 2 wherein said means for fastening comprises a hole extending from the hollow cylinder through said base so that a single lag bolt may be received through said insertion opening and fasten a base section to a roof rafter.

7. The mounting system of claim 2 wherein said support means comprises a pair of horizontal support members and a plurality of clamps slidably connected to said horizontal support members, where a solar panel once positioned upon said pair of horizontal support members is thereafter secured by the use of said clamps.

8. The mounting system of claim 2 wherein said means to secure said support means comprises threadably engaging the support means to the top end of a pair of said stanchions.

9. The mounting system of claim 3 wherein said support means comprises a pair of horizontal support members and a plurality of clamps slidably connected to said horizontal support members, where a solar panel once positioned upon said pair of horizontal support members is thereafter secured by the use of said clamps.

10. The mounting system of claim 3 wherein said means to secure said support means comprises threadably engaging the support means to the top end of a pair of said stanchions.

11. The mounting system of claim 4 wherein said means to secure said support means comprises threadably engaging the support means to the top end of a pair of said stanchions.

12. A mounting system for mounting a solar panel containing at least one module above a roof and secured to at least one roof rafter, said mounting system comprising:
   a) at least two roof mounts, each roof mount comprising:
      a substantially hollow cylinder having a base end, said cylinder having an offset wall, and an insertion opening pointing away from the roof;
      a guide tunnel extending through said offset wall in parallel relationship with said insertion opening;
      a hole in said base end for fastening said roof mount to a rafter;
      an elongate member having a top end and a bottom end, said bottom end being fitted into said insertion opening, thereby orientating said elongate member away from the roof;
   b) a pair of C-shaped horizontal members, each horizontal member secured to respective roof mounts;
   c) two end clamps for securing therebetween a solar panel to a respective horizontal member;
   f) a bi-module clamp for securing a pair of adjacent modules to a horizontal member wherein the number of bi-module clamps required is determined by the formula:
      number of bi-module clamps=(number of modules−1),
   g) means for fastening said end clamps to a respective said C-shaped horizontal member; and
   h) means for fastening said bi-module clamps to a respective said C-shaped horizontal member.

13. The mounting system of claim 12 wherein each of said end clamps comprise a lip end, each lip end having an underside surface for frictional engagement with the solar panel;

an end member distal from said lip end, said end member having a top surface, a bottom surface, an edge surface distal from said lip end and a hole for allowing the threaded stem of a bolt to pass through; and, a heel extending downward from said bottom surface, said heel positioned substantially at said edge surface.

14. A mounting base for supporting an object above a roof rafter comprising:

a base and an integrated hollow cylinder, said cylinder having an insertion opening pointing away from the roof;

an aperture positioned in the mounting base distal from said insertion opening, said aperture having a common axis of symmetry with said insertion opening; said insertion opening capable of receiving a lag bolt having a head and stem; and said aperture sized to permit the stem to pass through for frictional engagement with the rafter.

15. The mounting base of claim 14 wherein said integrated hollow cylinder includes an offset wall, said offset wall having a guide tunnel sized for receiving a drill bit, said guide tunnel designed to provide a perpendicular angle to a rafter for the drill bit to drill a pilot hole into the rafter.

16. A method for securing a mounting base to a roof rafter comprising the steps of:

providing a mounting base having a base and a substantially hollow cylinder having a base end, said cylinder having an offset wall and an insertion opening pointing away from the roof; a guide tunnel extending through said offset wall in parallel relationship with said insertion opening; and a hole in said base end extending through said base for receiving the stem of a lag bolt for fastening said roof mount to a rafter;

positioning said mounting base directly over a roof rafter so that said guide tunnel is in alignment with the rafter;

inserting a drill bit through said guide tunnel and drilling a pilot hole into the rafter;

sliding said mounting base so that said hole in said base end is in alignment with said pilot hole;

inserting a lag bolt through said insertion opening; and, fastening said mounting base to the roof by frictional engagement of the lag bolt to the rafter.

17. A solar panel support for supporting a solar panel having at least one module and which is mounted to a plurality of roof mounts comprising:

a pair of extruded C-shaped horizontal members; each horizontal member having a track;

a plurality of inserts for each horizontal member, each of said inserts adapted for slidable movement within the track of said horizontal member and each of said inserts having a threaded aperture;

a pair of end clamps for each horizontal member, each of said end clamps having an aperture for allowing the threaded stem of a bolt to pass through, said end clamps capable of being positioned for securing a solar panel therebetween when said end clamp is fastened to a respective horizontal member;

a plurality of bi-module clamps for each horizontal member, each of said bi-module clamps having an aperture for allowing the threaded stem of a bolt to pass through, said bi-module clamps capable of being positioned for securing adjacent solar modules when said bi-module clamp is fastened to a respective horizontal member, wherein the number of bi-module clamps required is determined by the formula:

number of bi-module clamps=(number of modules−1); and, means for attaching said pair of horizontal members to a plurality of roof mounts.

18. The solar panel support of claim 17 wherein each of said end clamps further comprise a lip end, each lip end having an underside surface for frictional engagement with the solar panel;

an end member distal from said lip end, said end member having a top surface, a bottom surface, an edge surface distal from said lip end; and, a heel extending downward from said bottom surface, said heel positioned substantially at said edge surface.

19. The solar panel support of claim 17 wherein the strength properties of said C-shaped horizontal member are enhanced upon frictionally engaging said end clamps, said bi-module clamps and the respective inserts to a respective said horizontal member.

20. The solar panel support of claim 17 wherein said extruded C-shaped elongated members are made of aluminum.

21. The solar panel support of claim 17 wherein said extruded C-shaped elongated members are made of composite material.

* * * * *